Patented July 11, 1944

2,353,423

UNITED STATES PATENT OFFICE 2,353,423

PROCESS OF PREPARING MIXED CELLULOSE ESTERS

John S. Tinsley, Highland Park, N. J., assignor to Hercules Powder Company, Wilmington, Del., a corporation of Delaware No Drawing. Application June 21, 1940, Serial No. 341,637

17 Claims. (Cl. 260—225)

This invention relates to the preparation of cellulose mixed esters and more particularly to the preparation of mixed cellulose esters containing acetyl groups and fatty acid groups of from 3 to 6 carbon atoms and still more particularly to the preparation of cellulose acetate propionate and cellulose acetate butyrate.

Cellulose mixed lower fatty acid esters such as cellulose acetate propionate and cellulose acetate butyrate have heretofore been made in various ways. However, the prior practices have presented numerous disadvantages. A principal disadvantage of such processes is that they require an excessive amount of acid or anhydride of higher molecular weight, that is of 3 to 6 carbon atoms in the fatty acid group. Another objection to these prior processes is that the resulting mixed cellulose ester does not contain as many of the higher fatty acid groups as would be desirable.

It is an object of the present invention to devise a process for the manufacture of cellulose mixed fatty acid esters containing acetyl groups and acyl groups of from 3 to 6 carbon atoms with a minimum of the acid or anhydride of higher molecular weight.

Another object is to carry out the manufacture of mixed cellulose esters of the foregoing type in such a manner that the proportion of the higher acyl groups is maintained with a reduced quantity of higher and more expensive fatty acid or fatty acid anhydride.

Still other objects of the present invention will more fully hereinafter appear.

I have discovered that mixed cellulose fatty acid esters containing a larger number of the higher acyl groups may be prepared from a minimum of expensive higher fatty acid or anhydride by initiating the esterification with a bath containing a high concentration of higher acyl groups (as, for example, all of the higher acyl groups which are to be employed and no or only a low concentration of acetyl groups) and as the esterification proceeds, adding acetyl groups (in the form of acetic acid or anhydride) to the esterification bath.

In accordance with the present invention, cellulose is esterified with an esterifying mixture comprising acyl groups of 3 to 6 carbon atoms and acetyl groups, the component carrying the acetyl groups being added to the esterifying mixture progressively as the esterification proceeds. I have discovered that the degree of substitution of the higher fatty acid groups is proportional to the ratio of higher acyl groups to total acyl groups in the acylating mixture. These acyl groups may be present either as the anhydride or the acid, an equilibrium being established independently of which is present as the anhydride. In order to produce mixed cellulose fatty acid esters economically, a minimum of the acid or anhydride of higher molecular weight must yield a maximum substitution of the higher molecular weight acyl group. In accordance with the present invention, this is effected by keeping the ratio of higher to lower acyl groups at a maximum at all times during acylation. This may be done for example, by adding all of the higher molecular weight acylating component at the start of the acylation, with only a small portion of the acetic component, and after acylation has begun, adding the remaining acetic component at intervals or continuously as the esterification reaction proceeds. In this manner, there is a minimum ratio of higher molecular weight acyl groups present at all times.

The cellulose employed may be of any suitable type, as for example, cotton linters, purified wood cellulose, or the like. It is preferred to employ cotton linters which have been pre-treated with a lower fatty acid such as formic, acetic, propionic, butyric, valeric, caproic, etc., as for example by commingling the cotton linters with from about 35% to about 45% and preferably approximately 38 to 40% of their weight of glacial (99–100%) acetic acid. Pre-treatment may be carried out at either atmospheric temperature (about 20° C) or at elevated temperatures ranging up to 50° C. The pre-treatment is preferably continued for one or more hours.

Following the pre-treatment of the cellulose in the manner just outlined, the cellulose, usually without separation of the acetic acid, is subjected to esterification. This may be accomplished either by the solution process wherein the cellulose ester goes into solution in a solvent present in the esterifying bath, or by the so-called fibrous process, wherein the cellulose is treated in a bath which contains a non-solvent for the cellulose ester whereby the cellulose ester retains the fibrous form of the cellulose originally taken. It is preferred, however, to employ the solution process. In accordance with this process, the mixture of cotton linters and the pre-treating glacial acetic acid may be commingled at an elevated temperature such as 30–35° C. with an esterifying bath comprising a solvent for the cellulose ester such as, acetic acid, propionic acid, butyric acid, methylene chloride, ethylene chloride, chloracetic acid, chloroform, etc., a fatty acid anhydride, such as, acetic anhydride, butyric anhydride, propionic anhydride, or even higher fatty acid anhydrides such as valeric anhydride, caproic anhydride, etc., the esterifying bath containing both acetyl and higher fatty acid groups, and an esterification catalyst such as sulfuric acid, perchloric acid, zinc chloride, sulfuryl chloride, etc. The catalyst usually comprises a small amount of sulfuric acid of concentration of 95 to 100%. The amount of concentrated sulfuric acid so employed as the catalyst may vary from 1 to 20% on the weight of cotton linters originally taken.

In accordance with the present invention, the bulk of the acetylating component such as acetic anhydride which supplies the acetyl groups which enter into the ester, is added progressively to the reaction mixture over the esterification. This may be accomplished either by adding all of the acetic acid anhydride gradually over the esterification, or adding a small portion of the acetic anhydride initially to the mixture and the remainder gradually over a prolonged period. In this specification by reference to gradual addition of acetic anhydride or to addition over the esterification, I intend to include either the addition at intervals, or the continuous addition of this component.

By the addition of the acetic anhydride in the manner described above, there is produced the unexpected result of a mixed ester containing a greater amount of the higher molecular weight acyl group, such as propionyl or butyryl for a given amount of propionyl or butyryl component of the esterification mixture, than has heretofore been possible. This is advantageous because it reduces materially the amount of expensive propionyl or butyryl compound necessary for effecting a given degree of propionyl or butyryl substitution into the product, or the preparation of a product having a higher degree of propionyl or butyryl substitution for a given amount of butyryl or propionyl compound required. In addition, the esterification proceeds more smoothly and more effectively than prior esterification processes.

The invention may be practiced in numerous ways. For example, there may be formed a mixture of cellulose and butyric or propionic anhydride, the mixture containing all of the butyric or propionic anhydride which is to be employed, and the acetic anhydride may be added over a prolonged time. The catalyst may be added initially with the butyric or propionic anhydride or it may be added in admixture with the acetic anhydride. Alternatively, the catalyst may have been employed or added during the pre-treatment of the cellulose. The invention may also be practiced by commingling the cellulose pre-treated or otherwise with butyric or propionic acid and adding acetic anhydride in required amount over a prolonged period of time. Numerous other methods of carrying out the principles of the present invention will be apparent to those skilled in the art.

Under some circumstances, the invention may be practiced by adding progressively during the esterification the acetyl components in the form of acetic acid such as glacial acetic acid of 99–100% acetic acid content. When this is done, it will usually be desirable or necessary to add the component supplying the higher acyl groups, such as propionic or butyric anhydride, to the cellulose before addition of the acetyl containing component is begun.

Instead of employing the simple acid anhydride, mixed acid anhydrides may be employed in the mixture provided the ratio of propionyl or butyryl or higher acyl groups to acetyl is maintained at an optimum figure throughout the esterification in the manner described herein. For example, acetic propionic anhydride, acetic butyric anhydride, propionic butyric anhydride, and the like may be used in the esterification mixture.

The addition of the acetyl containing components of the bath may be begun either immediately after esterification commences, at the same time as esterification commences, or at a later period. For example, if desired, the procedure of the present invention may comprise addition of a portion of the acetic anhydride initially, after which the mixture is allowed to stand for a prolonged period of time, following which addition of the balance of acetic anhydride is begun. Likewise, the esterification may be allowed to first take place in the absence of acetyl groups, thereby producing a cellulose propionate or butyrate, after which acetic anhydride may be gradually added over a prolonged period to introduce acetyl group into the ester.

If desired, the progress of the esterification may be followed closely by taking samples at periodic intervals and determining the ratio of free propionyl to free acetyl in the esterification bath in any manner as by difference from the propionyl or butyryl content of the ester and the total acyl content thereof, and the addition of the acetyl bearing constituents controlled accordingly.

The amount of acyl anhydride added in the esterification is preferably such that 4 or more mols of acyl total anhydride are added for each 162 g. of cellulose originally taken, that is for each glucose unit present in the cellulose taken. The amount of acyl anhydride added may vary from 4 to 10 mols per glucose unit. However, for purposes of economy, it is usually preferred to use not more than 6 mols total anhydride per glucose unit. As stated above, the acyl anhydride may be all in the form of a higher fatty acid anhydride such as propionic anhydride or butyric anhydride, although usually it will also comprise some acetic anhydride and may comprise acetic anhydride entirely.

While the principles of the invention are applicable generally in the preparation of mixed cellulose esters containing acetyl groups and higher acyl groups, it is particularly applicable to the preparation of such an ester containing from about 15% to about 20% of acetyl and from about 25% to about 35% or more of higher acyl such as propionyl or butyryl.

The relative amount of acetyl groups and higher acyl groups such as propionyl or butyryl introduced into the cellulose may vary within wide limits depending upon the type of mixed ester which it is desired to produce. The invention has been found to be particularly applicable in the production of a cellulose mixed lower fatty acid ester wherein the ratio of total propionyl or butyryl to acetyl introduced into the cellulose unit expressed in terms of mols of acyl groups, varies from about ½ to 1 up to about 10 to 1 and preferably from about 1 to 1 up to about 3 to 1. In general, the higher the ratio of higher acyl groups to acetyl groups, based upon total acyl groups employed in the esterification bath, the greater will be the substitution of higher acyl groups in the cellulose. The mol ratio of total propionyl or butyryl to acetyl in the esterifying bath may vary from about 1/10 to 1 up to about 100 to 1 and preferably from about 1/2 to 1 up to about 10 to 1.

The mol ratio of higher acyl groups such as propionyl or butyryl to acetyl in the original or starting mixture may vary from infinity downwardly. This ratio is infinity when no acetyl groups are present in the original starting mixture. It has been found to be satisfactory to employ an original mol ratio of propionyl or butyryl to acetyl of from about 15 to 1 down to about 3 to 1. (It will be borne in mind in the discussion herein with reference to mols of acyl groups and mols of acyl anhydride that 1 mol of acyl anhydride is equivalent to 2 mols of acyl groups.) When such a mol ratio of propionyl or butyryl to acetyl is employed, in the original mixture, the balance of the acetyl components, usually in the form of acetic anhydride, is added to the mixture gradually over the esterification, so that the final result is such that the ratio of total propionyl or butyryl to acetyl in the esterification bath is that set forth above.

The relative proportions of higher acyl groups such as butyryl or propionyl in the esterifying bath to cellulose and of acetyl groups in the esterifying bath to cellulose may vary within wide limits. For example, the number of mols propionyl or butyryl per glucose unit of cellulose may vary between about 6 and about 20, and the mols of total acetyl per glucose unit of cellulose may vary between about 3 and about 12. These figures are merely representative of satisfactory esterification procedures and are not limiting. While it is preferable to add all of the propionyl or butyryl groups initially, under some circumstances a small proportion of the butyryl or propionyl groups may be introduced along with the acetyl groups. For example, the invention may be carried out by adding most of the butyryl or propionyl initially and adding a small portion of it in admixture with the acetyl component such as acetic anhydride, which is added progressively to the initial mixture.

The rate of addition of the acetyl-bearing component may vary within wide limits depending upon the character of mixed ester desired to be produced. Satisfactory results are obtained when the acetic anhydride is added at such a rate that the mol of acetic anhydride added per mol of cellulose originally taken (calculated as glucose units) per hour varies from 0.5 to 2 mols acetic anhydride per glucose unit per hour. This rate of addition is preferably controlled in accordance with the rate at which propionyl or butyryl groups are entering the cellulose molecule, the latter rate being followed by periodic determinations of the composition of the cellulose ester or of the bath. Where a high ratio of mols of propionyl or butyryl to mols of cellulose is employed, as for example, from 10 to 20 mols propionyl or butyryl per mol of cellulose, a high rate of addition of the acetic anhydride may be used, as for example from 1 to 2 mols of acetic anhydride per mol of cellulose per hour. Where the ratio of mols of propionyl or butyryl to mols of cellulose is lower as for example from 5 to 10, the rate of addition of acetic anhydride may desirably be lower, as for example less than 1 mol of acetic anhydride per mol of cellulose per hour. Where the addition of acetic anhydride is commenced at the same time as the esterification, the addition of acetic anhydride may be at a lower rate than where the addition of acetic anhydride is not begun until the esterification is well under way. If a portion of the acetic anhydride is added at the start of esterification, followed by a cessation of the addition of acetic anhydride for a substantial period of time after which the remainder is added over an extended period of time, the rate of addition of this remainder may be greater than where the addition of acetic anhydride takes place gradually over the entire esterification period.

The proportion of the acetyl bearing component added over the esterification may vary within wide limits, depending upon conditions and upon the composition of mixed ester desired. It is usually desirable to add over the prolonged period at least 30% of the total acetyl groups, and preferably at least 50% up to as high as 90%, or even as high as 100%.

If desired, the esterification may be allowed to continue after the total amount of acetic anhydride or its equivalent, such as glacial acetic acid has been added to the esterifying mixture, and in fact usually this procedure will be desirable in order to allow the maximum substitution of acyl groups in the cellulose molecule.

After esterification to the desired extent is completed, as determined by the taking of a sample and analysis thereof, or as determined by experience with regard to the length of time necessary, or as indicated by the fact that the mass has become free of fibers and clear where the solution process is employed, usually after from 4 to 5 hours, the mixture may, if desired, be subjected to treatment for the hydrolyzing of the cellulose ester to a lower stage of esterification. The hydrolysis may be effected in any suitable manner known to the art, as for example, by the addition of water in an amount sufficient to bring about conversion of remaining anhydride to acid, but insufficient to precipitate the ester, for example, sufficient to yield a water concentration preferably of about 8% after the excess of anhydride is converted to the corresponding acid, the addition being accompanied by agitation of the mixture and followed by allowing the mass to stand at an elevated temperature, say 40 to 60° C. for an extended period of time, say 5 hours or longer until the cellulose ester in the mass has acquired the desired composition and solubility in various organic solvents. Preferably, the hydrolyzing water is added in the form of a 50–60% acetic acid solution to prevent local precipitation.

Following hydrolysis, if this be employed, the cellulose mixed ester is precipitated from the mass or solution in the usual manner as, for example, by commingling the solution with a large excess of water, the amount of water employed being such that the resulting aqueous solution is so low in concentration of acetic, propionic or butyric acids as to have no solvent or softening action on the cellulose mixed ester. The precipitated mixed ester is then washed with water in any desired manner until it is free from lower fatty acids and from inorganic acids such as sulfuric acid, after which the washed precipitated ester is dried in the usual manner.

The acylation of the cellulose may be carried out at an elevated temperature as for example, at from about 25 to about 40° C., and preferably from about 30 to about 35° C. The employment of an elevated temperature speeds up the esterification and makes for a commercially feasible process. It is preferred to maintain the temperature substantially constant throughout the acylation, this result being effected in any desired manner, for example, by starting with chilled reactants so that the normal initial temperature rise leads to the desired temperature.

Below are given several specific examples showing methods of carrying out the present invention.

Example 1

| | Parts by weight |
|---|---|
| Cotton linters | 250 |
| Glacial acetic acid (99-100%) | 101.8 |
| Propionic anhydride | 759 |
| Methylene chloride | 501 |
| Sulfuric acid (95%) | 2.5 |
| Acetic anhydride | 200 |

The cotton linters, which were of a high state of purity, were first pre-treated with the glacial acetic acid by commingling the linters with the acetic acid and allowing the mixture to stand at room temperature for 2 hours. Thereupon the propionic anhydride, the methylene chloride, and the sulfuric acid were added together to the mass of cotton linters and glacial acetic acid. The mixture was maintained at 30 to 35° C. throughout the esterification. The mixture was allowed to react at this temperature for 2½ hours after which the acetic anhydride was added continuously to the mixture over a period of 2 hours. After addition of the acetic anhydride was completed, the mixture was allowed to continue esterification for ½ hour whereupon it was free from fiber and clear. The mixture was then treated in the usual manner but without hydrolysis to recover the ester.

The cellulose acetate propionate thus made contained 16.1% acetyl (1.15 acetyl groups per glucose unit) and 33.1% propionyl (1.8 groups of propionyl per glucose unit).

In a comparative run wherein all conditions were the same except that all the acetic anhydride was added with the propionic anhydride, the methylene chloride and sulfuric acid, that is, at the start of esterification, the mixed ester produced had 20.0% acetyl (1.42 groups) and 28.0% propionyl (1.5 groups).

It will be seen that the process of this example gave an increase of 48.6% in the ratio of propionyl to acetyl in the mixed ester produced.

In this example, the ratio of mols of propionyl in the bath to the mols of cellulose (computed as glucose units) was 7.57. The mols of total anhydride per mol of cellulose was 5.05. Initial mol ratio of propionyl to acetyl in the bath was 6.88. The mol ratio of total propionyl to total acetyl was 2.08. The rate of addition of acetic anhydride was 0.64 mols per mol of cellulose per hour. The ratio of mols acetyl added over the 2½ hr. period to mols of acetyl present at the start of the esterification was 2.31 to 1, the percentage of acetyl so added being about 67%.

Example 2

| | Parts by weight |
|---|---|
| Cotton linters | 155 |
| Glacial acetic acid | 60 |
| Butyric acid | 1,200 |
| Sulfuric acid (95%) | 7.5 |
| Acetic anhydride | 450 |

The cotton linters were first pre-treated with the glacial acetic acid in the same manner as in Example 1. The mixture of cotton linters and acetic acid was then mixed with the butyric acid and the sulfuric acid. Esterification was then initiated by the addition of the acetic anhydride, the addition of which was continued over a 3½ hour period. The mixture was then allowed to stand for 1½ hours, whereupon a fiber-free clear mass was obtained. The temperature was maintained throughout the esterification at 30-35° C. The mixture was then subjected to hydrolysis by the addition of a mixture of 170 parts by weight of water and 193 parts by weight of acetic acid and maintaining the resulting mixture at 47½° C. for 5 hours. Thereupon, the mass was precipitated and the cellulose acetate butyrate recovered in the usual manner.

The cellulose acetate butyrate thus prepared contained 21.5% acetyl (1.58 acetyl groups) and 27.3% butyryl (1.22 groups).

A comparative procedure which was identical with the foregoing except that all of the acetic anhydride was added at the start of esterification with the butyric acid and the sulfuric acid, yielded a cellulose acetate butyrate having 24.0% acetyl (1.72 groups) and 24.8% butyryl (1.08 groups).

It will thus be seen that the process of this example resulted in a 21.0% increase in the ratio of butyryl to acetyl introduced into the cellulose.

In this example, the ratio of mols butyryl in the bath to mols of cellulose was 14.27. The ratio of mols of acetic anhydride to mols of cellulose was 4.62. The ratio of total mols acetyl in the bath to mols of cellulose was 10.27. The ratio of mols butyryl to mols acetyl in the bath was 1.4. The ratio of butyryl to mols of acetyl at the start of esterification was 13.63. The rate of addition of acetic anhydride was 1.32 mols acetic anhydride per mol of cellulose per hour. The ratio of mols acetyl added over the 3½ hour period to mols acetyl present at the start of the esterification was 9.24 to 1, the percentage of acetyl so added being about 90%.

Example 3

This example was identical with Example 2 except that ⅓ of the acetic anhydride (150 parts by weight) was added at the start of esterification with the butyric acid and the sulfuric acid. The mass was then allowed to stand at the esterification temperature for 1½ hours whereupon the remaining ⅔ of the acetic anhydride (300 parts by weight) was added continuously over a 2 hour period. Following the completion of the addition, the mass was allowed to stand for 1½ hours as in Example 2 and subsequently treated in the same manner as in Example 2.

The cellulose acetate butyrate prepared in this manner contained 21.8% acetyl (1.6 groups) and 27.6% butyryl (1.25 groups).

It will be seen that the process of this example gave a 22.5% increase in ratio of butyryl to acetyl as compared with the comparative run referred to in the discussion of Example 2.

In this example, the ratio of mols butyrl per mol of cellulose, mols total anhydride per mol of cellulose, and total mols of acetyl per mol of cellulose were the same as in Example 2. The mol ratio of butyryl to acetyl at the beginning of esterification was 3.55. The rate of addition of acetic anhydride was 1.5 mols per mol of cellulose per hour. The ratio of mols acetyl added over the 2 hour period to mols acetyl present at the start of esterification was 1.5 to 1, the percentage of acetyl so added being about 60%.

From the foregoing, it will be seen that the present invention provides a marked improvement in the manufacture of cellulose mixed esters such as cellulose butyrate and cellulose propionate and more particularly the more economical production of cellulose mixed esters of this type with a higher ratio of the higher acyl group to acetyl than has been heretofore possible. Alternatively, the principles of the present invention may be applied to more economically produce a cellulose mixed ester of the same ratio of propionyl or butyryl to acetyl as that heretofore available. The invention brings about a more effective utilization of the more expensive propionyl or butyryl components.

While the invention has been described with particular reference to cellulose acetate propionate and cellulose acetate butyrate, it may also be applied in the production of other mixed esters of similar type, such as cellulose acetate valerate and cellulose acetate caproate.

It will be understood that the details and examples hereinbefore set forth are illustrative only and that the invention as broadly described and claimed is in no way limited thereby.

What I claim and desire to protect by Letters Patent is:

1. In a process for preparing a cellulose mixed ester of acetic acid and an acid of 3–6 carbon atoms which comprises esterifying cellulose with an esterifying bath containing an anhydride of a fatty acid of 2–6 carbon atoms and a fatty acid of 2–6 carbon atoms, one of the said components containing acetyl groups and the other containing acyl groups of 3–6 carbon atoms, in the presence of an esterification catalyst, the improvement which consists in initiating esterification in the presence of less than 50% of the total acetyl groups and subsequently adding the balance of at least 50% of the total acetyl groups over a prolonged period during the esterification, the said acetyl and acyl groups being in the form of compounds selected from the group consisting of the corresponding acids and acid anhydrides.

2. In a process for preparing a cellulose mixed ester of acetic acid and an acid of 3–6 carbon atoms wherein the ratio of the acyl groups of the 3–6 carbon atom acid to the acetyl groups is at least 1:1, which process comprises esterifying the cellulose with an esterifying bath containing the anhydride of a fatty acid of 2–6 carbon atoms, acetyl groups, acyl groups of 3–6 carbon atoms, nonreacting solvent for the cellulose ester, and an esterification catalyst, the improvement which consists in initiating the esterification in the presence of less than 50% of the total acetyl groups, and subsequently adding the balance of at least 50% of the total acetyl groups over a prolonged period during the esterification, the said acyl and acetyl groups being in the form of compounds selected from the group consisting of the corresponding acids and anhydrides thereof.

3. A process for the preparation of a mixed cellulose ester of acetic acid and a fatty acid of 3–6 carbon atoms which comprises mixing cellulose with a bath containing an anhydride of a fatty acid of 2–6 carbon atoms, nonreacting solvent for the said mixed ester, an esterification catalyst, acetyl groups and acyl groups of 3–6 carbon atoms, under esterification conditions, and adding acetyl groups at between about 0.5 and about 2 mols per hour for each mol of cellulose reacted during the esterification reaction, the said acetyl groups and acyl groups being in the form of compounds selected from the group consisting of the the corresponding acids and acid anhydrides.

4. A method for the preparation of a cellulose mixed ester of acetic acid and a fatty acid of 3–6 carbon atoms which comprises subjecting cellulose to reaction with an esterifying bath comprising a fatty acid of 2–6 carbon atoms and an anhydride of a fatty acid of 2–6 carbon atoms, both acetyl groups and acyl groups of 3–6 carbon atoms being present in the bath, the mol ratio of acetyl to higher acyl groups being less than about 1–3, and adding acetyl groups gradually during the course of the resulting esterification, the said acetyl and acyl groups being in the form of compounds from the group consisting of the corresponding acids and acid anhydrides.

5. A process for preparing a cellulose mixed ester of acetic acid and a fatty acid of 3–6 carbon atoms which comprises subjecting cellulose to esterification reaction in a bath containing a fatty acid of 2–6 carbon atoms and an anhydride of a fatty acid of 2–6 carbon atoms, the bath including acyl groups of a fatty acid of 3–6 carbon atoms but containing less than 70% of the total acetyl groups to which the cellulose is subjected in esterification, then, in a period subsequent to the beginning of esterification but before substantial completion of esterification, adding acetyl groups to the bath in a quantity of from 30% to 100% of the total acetyl groups to which the cellulose is subjected in esterification, and completing the esterification reaction, the acyl and acetyl groups referred to being in the form of compounds selected from the group consisting of the corresponding acids and their anhydrides.

6. A process for preparing a cellulose mixed ester of acetic acid and a fatty acid of 3–6 carbon atoms which comprises subjecting cellulose to esterification reaction in a bath containing an anhydride of a 2–6 carbon atom fatty acid and acyl groups of a 3–6 carbon atom fatty acid but containing less than 70% of the total acetyl groups to which the cellulose is subjected in esterification, then, following initiation of the esterification reaction but prior to substantial completion of esterification of the cellulose, adding acetyl groups in a quantity of from 30% to 100% of the total acetyl groups to which the cellulose is subjected in esterification, and completing the esterification, the acyl and acetyl groups referred to being in the form of compounds selected from the group consisting of the corresponding acids and their anhydrides.

7. A process for preparing a cellulose mixed ester of acetic acid and a fatty acid of 3–6 carbon atoms which comprises subjecting cellulose to esterification reaction in a bath containing an anhydride of a 2–6 carbon atom fatty acid and acyl groups of a 3–6 carbon atom fatty acid but containing less than 70% of the total acetyl groups to which the cellulose is subjected in esterification, permitting substantial partial esterification to take place, then, prior to substantial completion of esterification of the cellulose, adding acetyl groups in a quantity of from 30% to 100% of the total acetyl groups to which the cellulose is subjected in esterification and completing the esterification, the acyl and acetyl groups referred to being in the form of compounds selected from the group consisting of the corresponding acids and their anhydrides.

8. A process for preparing a cellulose mixed ester of acetic acid and a fatty acid of 3–6 carbon atoms which comprises subjecting cellulose to esterification reaction in a bath containing acyl groups of a fatty acid of 3-6 carbon atoms, an anhydride of said fatty acid, a solvent for the cellulose mixed ester, and an esterification catalyst but containing less than 70% of the total acetyl groups to which the cellulose is subjected in esterification, then, subsequent to initiation of esterification of the cellulose but prior to substantial completion of esterification, progressively adding acetyl groups in a quantity of from 30% to 100% of the total acetyl groups to which the cellulose is subjected in esterification, and completing the esterification, the acyl and acetyl groups referred to being in the form of compounds selected from the group consisting of the corresponding acids and their anhydrides.

9. In a process for the preparation of a cellulose mixed ester of acetic acid and a fatty acid of 3-6 carbon atoms in which the combined 3-6 carbon atom acid groups have a mol ratio to the combined acetic acid groups between ½ to 1 and 10 to 1, by reacting cellulose with a bath containing a fatty acid and a fatty acid anhydride, one of which is acetyl and the other of which is of a 3-6 carbon atom acyl group, and an esterification catalyst, the improvement which consists in commencing the esterification of the cellulose in said bath with the bath containing less than 70% of the total acetyl groups to which the cellulose is subjected in esterification, and thereafter, but prior to substantial completion of esterification, progressively adding acetic anhydride to the bath during the esterification, the acetic anhydride so added containing in excess of 30% of the total acetyl groups in acid and anhydride form to which the cellulose is subjected in esterification.

10. In a process for the preparation of a cellulose acetate propionate in which the propionate groups have a mol ratio to the acetate groups between ½ to 1 and 10 to 1 by reaction of cellulose with propionic and acetic anhydrides, the improvement which consists in commencing esterification of cellulose with a bath containing propionic anhydride, solvent for the cellulose acetate propionate, and an esterification catalyst but containing less than 70% of the total acetyl groups to which the cellulose is subjected in esterification, and thereafter, but prior to substantial completion of the esterification, progressively adding acetic anhydride to the bath over a prolonged period of time during esterification, the acetic anhydride so added containing in excess of 30% of the total acetyl groups in acid and anhydride form to which the cellulose is subjected in esterification.

11. In a process for the preparation of a cellulose acetate butyrate in which the butyrate groups have a mol ratio to the acetate groups between ½ to 1 and 10 to 1 by reaction of cellulose with butyric and acetic anhydrides, the improvement which consists in commencing esterification of cellulose with a bath containing butyric anhydride, solvent for the cellulose acetate butyrate, and an esterification catalyst but containing less than 70% of the total acetyl groups to which the cellulose is subjected in esterification, and thereafter, but prior to substantial completion of the esterification, progressively adding acetic anhydride to the bath over a prolonged period of time during esterification, the acetic anhydride so added containing in excess of 30% of the total acetyl groups in acid and anhydride form to which the cellulose is subjected in esterification.

12. In a process for the preparation of a cellulose acetate propionate in which the propionate groups have a mol ratio to the acetate groups between ½ to 1 and 10 to 1 by reaction of cellulose with a bath containing reactive acetyl and propionyl groups as components of a mixture of fatty acid of 2-3 carbon atoms and anhydride of 2-3 carbon atom fatty acid and containing an esterification catalyst, the improvement which consists in partially esterifying the cellulose in said reaction bath with the bath containing less than 70% of the total acetyl groups to which the cellulose is subjected in esterification, and subsequently, but prior to substantial completion of esterification, adding acetic anhydride to the bath during esterification, the acetic anhydride so added containing in excess of 30% of the total acetyl groups in acid and anhydride form to which the cellulose is subjected in esterification.

13. In a process for the preparation of a cellulose acetate butyrate in which the butyrate groups have a mol ratio to the acetate groups between ½ to 1 and 10 to 1 by reaction of cellulose with a bath containing reactive acetyl and butryl radicals in the form of compounds selected from the group of the corresponding fatty acids and anhydrides thereof, an anhydride and an acid of the said group being present, and containing an esterification catalyst, the improvement which consists in partially esterifying the cellulose in said reaction bath with the bath containing less than 70% of the total acetyl groups to which the cellulose is subjected in esterification, and subsequently, but prior to substantial completion of esterification, adding acetic anhydride to the bath during esterification, the acetic anhydride so added containing in excess of 30% of the total acetyl groups in acid and anhydride form to which the cellulose is subjected in esterification.

14. In a process for the preparation of a cellulose mixed ester of acetic acid and a fatty acid of 3-6 carbon atoms in which the combined 3-6 carbon atom acid groups have a mol ratio to the combined acetic acid groups between ½ to 1 and 10 to 1, by reacting cellulose with a bath containing methylene chloride, sulphuric acid as esterification catalyst, an anhydride of a fatty acid of 2-6 carbon atoms, acetyl groups and acyl groups of 3-6 carbon atom fatty acids, the improvement which consists in subjecting the cellulose to said bath containing less than 50% of the total acetyl groups to which the cellulose is subjected during the entire esterification and then adding acetyl groups comprising more than 50% of said total progressively over a prolonged period of time during the esterification and prior to substantial completion of the esterification, the acyl and acetyl groups referred to being in the form of compounds selected from the group consisting of the corresponding acids and their anhydrides.

15. A process for preparing a cellulose mixed ester of acetic acid and a fatty acid of 3-6 carbon atoms which comprises pretreating cellulose with a fatty acid of 2-6 carbon atoms, initiating esterification of the cellulose by subjecting it to a bath comprising the said fatty acid, an anhydride of a 2-6 carbon atom fatty acid and an esterification catalyst, the bath containing acyl groups of a 3-6 carbon atom fatty acid but containing from 0% to 70% of the total acetyl groups to which the cellulose is subjected in esterification, then, after substantial partial esterification but prior to substantial completion of esterification, adding acetyl groups to the bath, the acetyl groups so added containing from 30% to 100% of the total acetyl groups to which the cellulose is subjected in esterification, the acyl and acetyl groups referred to being in the form of compounds selected from the group consisting of the corresponding acids and their anhydrides.

16. A process for preparing a cellulose acetate propionate which comprises pretreating cellulose with acetic acid, subjecting the pretreated cellulose to an esterification bath comprising acetic acid, propionic anhydride, methylene chloride, and 1–20% by weight of the cellulose of sulphuric acid but containing from 0% to 70% of the total acetyl groups to which the cellulose is subjected in esterification, then, over a prolonged period subsequent to initiation of esterification but prior to substantial completion of esterification, progressively adding acetic anhydride to the bath, the acetic anhydride so added containing from 30% to 100% of the total acetyl groups in acid and anhydride compound form to which the cellulose is subjected during esterification, and completing the esterification.

17. A process for preparing a cellulose acetate butyrate which comprises pretreating cellulose with acetic acid, subjecting the pretreated cellulose to an esterification bath comprising acetic acid, butyric anhydride, methylene chloride, and 1–20% by weight of the cellulose of sulphuric acid but containing from 0% to 70% of the total acetyl groups to which the cellulose is subjected in esterification, then, over a prolonged period subsequent to initiation of esterification but prior to substantial completion of esterification, progressively adding acetic anhydride to the bath, the acetic anhydride so added containing from 30% to 100% of the total acetyl groups in acid and anhydride compound form to which the cellulose is subjected during esterification, and completing the esterification.

JOHN S. TINSLEY.